(12) United States Patent
Kim

(10) Patent No.: US 12,371,097 B2
(45) Date of Patent: Jul. 29, 2025

(54) METHOD AND DEVICE FOR GENERATING FEEDBACK TORQUE IN CASE OF MOTOR FAULT IN SFA SYSTEM

(71) Applicant: HL MANDO CORPORATION, Pyeongtaek-si (KR)

(72) Inventor: Taesik Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 456 days.

(21) Appl. No.: 17/738,615

(22) Filed: May 6, 2022

(65) Prior Publication Data

US 2023/0192183 A1    Jun. 22, 2023

(30) Foreign Application Priority Data

Dec. 21, 2021    (KR) .................. 10-2021-0183852

(51) Int. Cl.
*B62D 5/04*    (2006.01)
*B62D 6/00*    (2006.01)
*H02H 7/08*    (2006.01)

(52) U.S. Cl.
CPC ......... *B62D 5/0484* (2013.01); *B62D 5/0487* (2013.01); *B62D 6/008* (2013.01); *H02H 7/0822* (2013.01)

(58) Field of Classification Search
CPC .... B62D 5/0484; B62D 5/0487; B62D 6/008; B62D 5/006; H02H 7/0822; H02H 7/0833; H02H 7/1227; H02H 7/0838; H02P 29/024; H02P 29/028; G01R 31/34; G01R 31/52

See application file for complete search history.

(56) References Cited

U.S. PATENT DOCUMENTS

| | | | |
|---|---|---|---|
| 11,192,581 B2 * | 12/2021 | Polmans | B62D 6/008 |
| 11,919,526 B1 * | 3/2024 | Agarwal | B60W 50/029 |
| 2022/0289288 A1 * | 9/2022 | Hultén | B62D 6/008 |

FOREIGN PATENT DOCUMENTS

| | | | | |
|---|---|---|---|---|
| DE | 102004030685 B4 * | 12/2018 | | B62D 5/003 |
| DE | 102021117307 A1 * | 5/2022 | | |
| DE | 102021117011 A1 * | 1/2023 | | |
| WO | WO-2021076025 A1 * | 4/2021 | | B62D 17/00 |

* cited by examiner

*Primary Examiner* — Mary Cheung
(74) *Attorney, Agent, or Firm* — WOMBLE BOND DICKINSON (US) LLP

(57) ABSTRACT

The present disclosure relates to a method of generating feedback force in case of a motor fault in a Steering Feedback Actuator (SFA) system. The method includes: determining whether a fault occurs in a motor associated with an SFA system; determining the type of fault when it is determined that the fault occurs in the motor; and generating feedback force associated with the SFA system by controlling the motor based on the determined type of fault.

14 Claims, 9 Drawing Sheets

METHOD AND DEVICE FOR GENERATING FEEDBACK TORQUE IN CASE OF MOTOR FAULT IN SFA SYSTEM

CROSS-REFERENCE TO RELATED APPLICATION

This application claims benefit and priority to Korean Patent Application No. 10-2021-0183852, filed on Dec. 21, 2021, with the Korean Intellectual Property Office, the disclosure of which is incorporated herein in its entirety by reference.

TECHNICAL FIELD

The present disclosure relates to a method and a device for generating feedback force in case of a motor fault in a Steering Feedback Actuator (SFA) system, and more particularly, to a method and a device for generating feedback force in case of a motor fault in an SFA system for providing a stable steering feel to a driver.

BACKGROUND

In the steering system, when a driver rotates a steering wheel, it is required to provide feedback force so that the driver can feel an appropriate steering feel according to a driving situation. Herein, the feedback force is force acting in a direction opposite to the rotational direction of the steering wheel, and the size of the feedback force may be changed according to the degree of rotation of the steering wheel, a driving speed of a vehicle, and the like.

In the meantime, the feedback force may be generated by a feedback force motor associated with a Steering Feedback Actuator (SFA) system. However, when a fault occurs in the feedback force motor, it may be difficult to provide a driver with appropriate feedback force. In general, in order to respond to the fault of the motor, a separate redundant system may be provided, but when the redundant system is used, there is a problem in that a lot of unnecessary cost is consumed in the design of a steering system.

SUMMARY

The present disclosure has been made in an effort to provide a method of generating feedback force in case of a motor fault of a Steering Feedback Actuator (SFA) system, a computer program stored in a computer readable medium, and a computer readable medium and a device (system) in which the computer program is stored.

The present disclosure may be implemented by various methods including a method, a device (system), a computer program stored in a computer readable medium, or a computer readable medium in which a computer program is stored.

An exemplary embodiment of the present disclosure provides a method of generating feedback force when a motor of a Steering Feedback Actuator (SFA) system has a fault, the method being performed by at least one processor, the method including: determining whether a fault occurs in a motor associated with an SFA system; determining the type of fault when it is determined that the fault occurs in the motor; and generating feedback force associated with the SFA system by controlling the motor based on the determined type of fault.

According to the exemplary embodiment of the present disclosure, the motor is associated with a three-phase inverter including a U-phase, a V-phase, and a W-phase.

According to the exemplary embodiment of the present disclosure, the inverter is associated with a battery cutoff switch which blocks a high current between a battery associated with the motor and the inverter. The battery cutoff switch is controlled based on whether the fault occurs in the motor.

According to the exemplary embodiment of the present disclosure, the type of fault includes a first fault type in which any one phase among the U-phase, the V-phase, and the W-phase is open, a second fault type in which any one of phase among the U-phase, the V-phase, and the W-phase is short, and a third fault type in which any two phases among the U-phase, the V-phase, and the W-phase are interphase short.

According to the exemplary embodiment of the present disclosure, the generating of the feedback force associated with the SFA system by controlling the motor based on the determined type of fault includes, when it is determined that the type of fault is the first fault type, generating feedback force by performing duty control on a Field Effect Transistor (FET) associated with the other two non-opened phases or generating feedback force associated with the SFA system by on-controlling the FET.

According to the exemplary embodiment of the present disclosure, the generating of the feedback force associated with the SFA system by controlling the motor based on the determined type of fault includes, when it is determined that the type of fault is the second fault type, generating feedback force by performing duty control on the U-phase, the V-phase, and the W-phase or generating feedback force associated with the SFA system by on-controlling FETs associated with the U-phase, the V-phase, and the W-phase.

According to the exemplary embodiment of the present disclosure, the generating of the feedback force associated with the SFA system when it is determined that the type of fault is the second fault type includes generating feedback force by performing the duty control near a region except for a lock end of a steering wheel associated with the SFA system, and generating feedback force associated with the SFA system by on-controlling FETs associated with the U-phase, the V-phase, and the W-phase near the lock end of the steering wheel.

According to the exemplary embodiment of the present disclosure, the generating of the feedback force associated with the SFA system by controlling the motor based on the determined types of faults includes, when it is determined that the type of fault is the third fault type, generating feedback force by performing duty control on the U-phase, the V-phase, and the W-phase or generating feedback force associated with the SFA system by on-controlling FETs associated with the U-phase, the V-phase, and the W-phase.

According to the exemplary embodiment of the present disclosure, the generating of the feedback force associated with the SFA system when it is determined that the type of fault is the third fault type includes generating feedback force by performing the duty control near a region except for a lock end of a steering wheel associated with the SFA system, and generating feedback force associated with the SFA system by on-controlling FETs associated with the U-phase, the V-phase, and the W-phase near the lock end of the steering wheel.

According to the exemplary embodiment of the present disclosure, the inverter is associated with a plurality of current detection sensors including a first current detection sensor, a second current detection sensor, and a third current detection sensor. The determining of whether the fault occurs in the motor associated with the SFA system includes determining whether the fault occurs in the motor associated with the SFA system based on the first current detection sensor associated with the U-phase, the second current detection sensor associated with the V-phase, and the third current detection sensor associated with the W-phase.

Another exemplary embodiment of the present disclosure provides a computing device, including: a communication module; a memory; and at least one processor connected with the memory and configured to execute at least one computer readable program included in the memory. The said at least one program determines whether a fault occurs in a motor associated with an SFA system includes commands for determining the type of fault when it is determined that the fault occurs in the motor; and generating feedback force associated with the SFA system by controlling the motor based on the determined type of fault.

The said at least one program further includes commands for generating feedback force by performing duty control on a Field Effect Transistor (FET) associated with the other two non-opened phases or generating feedback force associated with the SFA system by on-controlling the FET when it is determined that the type of fault is the first fault type.

According to the exemplary embodiment of the present disclosure, the said at least one program further includes commands for generating feedback force by performing duty control on the U-phase, the V-phase, and the W-phase or generating feedback force associated with the SFA system by on-controlling FETs associated with the U-phase, the V-phase, and the W-phase when it is determined that the type of fault is the second fault type.

According to the exemplary embodiment of the present disclosure, the said at least one program further includes commands for generating feedback force by performing the duty control near a region except for a lock end of a steering wheel associated with the SFA system, and generating feedback force associated with the SFA system by on-controlling FETs associated with the U-phase, the V-phase, and the W-phase near the lock end of the steering wheel.

According to the exemplary embodiment of the present disclosure, the said at least one program further includes commands for generating feedback force by performing duty control on the U-phase, the V-phase, and the W-phase or generating feedback force associated with the SFA system by on-controlling FETs associated with the U-phase, the V-phase, and the W-phase when it is determined that the type of fault is the third fault type.

According to the exemplary embodiment of the present disclosure, the said at least one program further includes commands for generating feedback force by performing the duty control near a region except for a lock end of a steering wheel associated with the SFA system, and generating feedback force associated with the SFA system by on-controlling FETs associated with the U-phase, the V-phase, and the W-phase near the lock end of the steering wheel.

According to the exemplary embodiment of the present disclosure, the inverter is associated with a plurality of current detection sensors including a first current detection sensor, a second current detection sensor, and a third current detection sensor. The said at least one program further includes commands for determining whether the fault occurs in the motor associated with the SFA system based on the first current detection sensor associated with the U-phase, the second current detection sensor associated with the V-phase, and the third current detection sensor associated with the W-phase.

According to the exemplary embodiments of the present disclosure, when a fault occurs in a feedback force motor and/or an inverter associated with a feedback force motor, the SFA system may stably generate and provide feedback force through a motor control according to the fault type even without using a separate redundant system.

According to the exemplary embodiments of the present disclosure, the motor and/or the inverter is adaptively controlled based on the size of required load according to the degree of rotation of a steering wheel, thereby continuously providing stable steering feel to a driver.

According to the exemplary embodiments of the present disclosure, the battery cutoff switch is added, so that it is possible to stably generate braking torque and/or feedback force without a problem, such as overload, even when motor control is performed in case of the fault occurrence.

According to the exemplary embodiments of the present disclosure, it is possible to simply detect a fault associated with the motor by using an MCU and the plurality of current detection sensors.

The effects obtainable from the present disclosure are not limited to the foregoing effects, and other non-mentioned effects will be clearly understood by those skilled in the art from the description below.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Exemplary embodiments of the present disclosure will be described with reference to the accompanying drawings to be described below, and like reference numbers herein refer to, but are not limited to, like elements.

DETAILED DESCRIPTION

Figure 1:
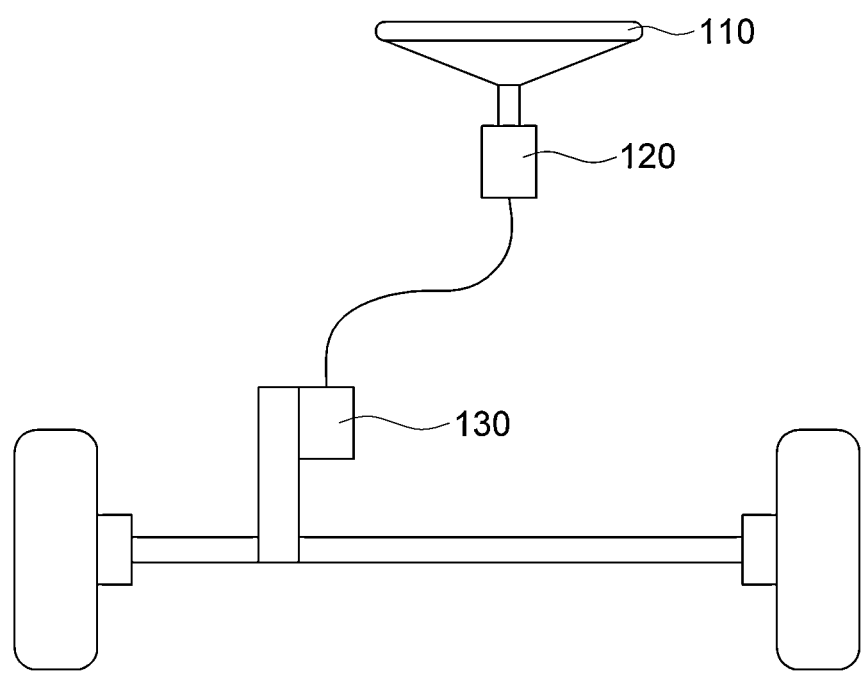
FIG. 1 is a diagram illustrating an example of a Steer by Wire (SbW) system including a Steering Feedback Actuator (SFA) system and a Road Wheel Actuator (RWA) system according to an exemplary embodiment of the present disclosure.

Hereinafter, particular contents for carrying out the present disclosure will be described in detail with reference to the accompanying drawings. However, in the description below, if there is a risk of unnecessarily obscuring the gist of the present disclosure, detailed descriptions of well-known functions or configurations will be omitted. In the accompanying drawings, same or corresponding constituent elements are assigned the same reference numerals. In addition, in the description of the exemplary embodiments below, overlapping description of the same or corresponding constituent elements may be omitted. However, even if the description regarding constituent elements is omitted, it is not intended that such constituent elements are not included in any exemplary embodiment.

The advantages and characteristics of the disclosed exemplary embodiment, and a method for achieving the advantages and characteristics will become clear by referring to the exemplary embodiment, which is described in detail, together with the accompanying drawings. However, the present disclosure is not limited to exemplary embodiments disclosed herein but will be implemented in various forms, and the exemplary embodiments are provided so that the present disclosure is completely disclosed, and a person of ordinary skilled in the art can fully understand the scope of the present disclosure.

Terms used in this specification will be briefly described, and the disclosed exemplary embodiments will be described in detail. The terms used in this specification have been selected as currently widely used general terms as possible while considering the functions in the present disclosure, but this may vary depending on the intention or precedent of the engineer in the related field, the emergence of new technology, and the like. In addition, in specific cases, there are also terms arbitrarily selected by the applicant, and in this case, the meaning will be described in detail in the description of the relevant invention. Accordingly, the term used in the present disclosure should be defined based on the meaning of the term and the entire contents of the present disclosure, simply not a name of the term.

In the present specification, the singular expression includes the plural expression unless the context clearly dictates the singular. Further, the plural expression includes the singular expression unless the context clearly dictates the plural. Further, when a part "includes" other constituent elements, this means that other constituent elements may be further included, rather than excluding other constituent elements, unless otherwise stated.

In the present disclosure, terms such as "comprises", "comprising", and the like may indicate that features, steps, operations, elements and/or constituent elements are present, but this term does not exclude the addition of one or more other functions, steps, acts, elements, constituent elements, and/or combinations thereof.

In the present disclosure, when a particular constituent element is referred to as "is coupled to", "is combined with", "is connected to", or "reacts" to another constituent element, the particular constituent element may be directly coupled to, combined with, and/or connected to or may react with another constituent element, but the present disclosure is not limited thereto. For example, there may be one or more intermediate constituent elements between a particular constituent element and another constituent element. In addition, in the present disclosure, "and/or" may include each of one or more of the listed items or combinations of at least a portion of one or more of the items.

In the present disclosure, terms such as "a first" and "a second" are used to distinguish a specific constituent element from other constituent elements, and the above-described constituent elements are not limited by these terms. For example, a "first" constituent element may be an element of the same or similar type as a "second" constituent element.

In the present disclosure, "Steer by Wire (SbW) system" refers to an electric signal type intelligent steering system that transmits the driver's will to steer with an electric signal without a mechanical connection between a steering wheel and vehicle wheels and control steering. According to an exemplary embodiment, the SbW system may include a Steering Feedback Actuator (SFA) and a Road Wheel Actuator (RWA), and the SFA system and the RWA system may be connected by a wire transmitting an electric signal. The SFA system may be an actuator system which generates steering control information associated with a steering angle based on the degree of rotation of the steering wheel of the vehicle, a user's input, and the like, and provides the user with feedback force of the steering wheel, and the RWA system may be a system that moves the wheels of the vehicle based on the steering control information. The SbW system may control an operation of the wheel of the vehicle based on the steering control information.

The present disclosure, an "Electronic Control Unit (ECU)" is a module associated with the SFA system and/or the RWA system, and may refer to a module for generating, processing, and/or managing a predetermined electric signal for controlling the vehicle.

In the present disclosure, "duty control" may refer to a control method of controlling a torque generated by a motor by controlling a ratio of the time that the motor is operating and the time that the motor is not operating.

In the present disclosure, a "lock end" may refer to a region in which rotation of the steering wheel does not proceed any further. For example, the steering wheel may rotate 1 to 1.5 turns in a clockwise or counterclockwise direction, and a lock end in which the steering wheel does not rotate any more after rotating 1 to 1.5 turns may be formed.

FIG. 1 is a diagram illustrating an example of a Steer by Wire (SbW) system including a Steering Feedback Actuator (SFA) system 120 and a Road Wheel Actuator (RWA) system 130 according to an exemplary embodiment of the present disclosure. According to the exemplary embodiment, the SbW system may be a steering system in which a steering wheel 110 is connected with wheels of a vehicle by a wire. The SbW system may include an SFA system 120 and an RWA system 130 connected with the steering wheel 110.

According to the exemplary embodiment, when a driver rotates the steering wheel 110 of the vehicle, the SFA system 120 may generate an electric signal according to an angle of the rotated steering wheel 110. The electric signal generated as described above may be provided to the RWA system 130 through the wire, and the RWA system 130 may operate the wheel of the vehicle by using the received electric signal.

As described above, when the driver controls the steering of the vehicle by rotating the steering wheel 110 of the vehicle, it may be required to provide an appropriate steering feel to the driver. In particular, in order to provide an appropriate steering feel to the driver, it may be required to provide feedback force in a direction opposite to a direction in which the driver rotates the steering wheel 110. For example, when the driver rotates the steering wheel 110 in a clockwise direction, feedback force in a counter clockwise direction may be generated and provided for controlling a shaft associated with the steering wheel 110 to be centered.

According to the exemplary embodiment, the SbW system may include a feedback force motor for generating and providing feedback force. For example, when the wheels of the vehicle rotate, feedback information associated with the rotation of the wheels of the vehicle may be provided to the ECU associated with the feedback force motor. In this case, the ECU may calculate the size of the feedback force to be provided to the driver based on the received feedback information and generate an electric signal associated with the calculated feedback force. When the electric signal generated as described above is provided to the feedback force motor, the feedback force motor may generate a braking torque for providing the feedback force based on the corresponding electric signal. Then, the feedback force may be generated and provided by using the generated braking torque.

According to the exemplary embodiment, the feedback force motor may be a three-phase motor associated with a three-phase inverter including a U-phase, a V-phase, and an W-phase. For example, when the three-phase inverter is used, each phase has a phase difference of 120 degrees, so that a rotation direction of the feedback force motor may be easily changed. Further, when the three-phase inverter is used, efficiency of power generated by the feedback force motor may increase, and stable power may be continuously generated.

According to the exemplary embodiment, even when a fault occurs in the feedback force motor generating feedback force and/or the braking torque and/or the three-phase inverter associated with the feedback force motor, it may be required to provide appropriate feedback force to the driver for safety and the like. Herein, the fault is a single fault, and may include the case where any one phase of the U-phase, the V-phase, and the W-phase of the three-phase inverter is opened, any one phase of the U-phase, the V-phase, and the W-phase is short, and any two phases of the U-phase, the V-phase, and the W-phase is interphase short. That is, even when the single fault occurs, the feedback force motor may be controlled so as to stably generate feedback force according to each fault type. By the foregoing configuration, when the fault occurs in the feedback force motor and/or the inverter associated with the feedback force motor, the SFA system 120 may stably generate and provide feedback force through the control of the motor according to the type of fault even without using a separate redundant system.

Figure 2:
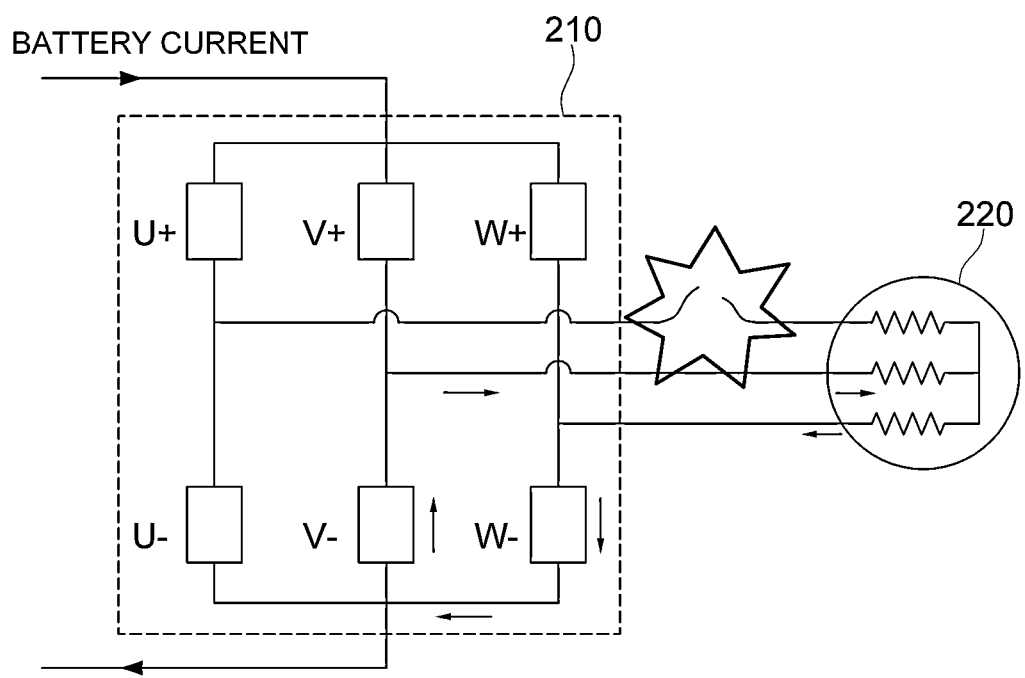
FIG. 2 is a diagram illustrating an example in which feedback force is generated when an opening occurs according to the exemplary embodiment of the present disclosure.

FIG. 2 is a diagram illustrating an example in which feedback force is generated when an opening occurs according to the exemplary embodiment of the present disclosure. According to the exemplary embodiment, even when an opening occurs, the inverter 210 and the motor 220 may be controlled so as to generate feedback force. As illustrated, the inverter 210 may be the three-phase inverter including a U-phase, a V-phase, and a W-phase, and the motor 220 may be configured to be associated with the three-phase inverter.

In general, a battery current may be provided to the motor 220 through the U-phase, the V-phase, and the W-phase having a phase difference of 120°. However, when any one of the U-phase, the V-phase, and the W-phase is opened, the motor 220 may have a fault. In the illustrated example, when the U-phase is opened, the current flowing through the U-phase may be blocked, and accordingly, the motor 220 and/or the inverter 210 may not perform normal three-phase driving.

According to the exemplary embodiment, in order to stably generate braking torque and/or feedback force even when any one of the phases is opened, the control of the motor 220 and/or the inverter 210 may be performed. In the illustrated example, the inverter 210 may include six Field Effect Transistors (FETs), for example, an FET corresponding to a U+ phase, an FET corresponding to a U-phase, an FET corresponding to a V+ phase, an FET corresponding to a V-phase, an FET corresponding to a W+ phase, and an FET corresponding to a W-phase. When the opening occurs, the braking torque and/or feedback force may be generated through the control of each FET included in the inverter 210.

According to the exemplary embodiment, when the U-phase is opened, the FETs associated with the V-phase and the W-phase or the V+ phase and the W+ phase may be duty controlled or on (close) controlled, and accordingly, the braking torque and/or feedback force may be generated. That is, when one phase is opened, a current may flow in the motor 220 through the remaining two phases, and according to the flow of the current, the braking torque and/or the feedback force associated with the SFA system may be generated.

According to the exemplary embodiment, the size of braking torque and/or feedback force required near the lock end of the steering wheel may be different from the size of braking torque and/or feedback force required near the region except for the lock end. For the implementation of different loads, the duty control may be performed near the region except for the lock end of the steering wheel associated with the SFA system and feedback force may be generated, and the FETs associated with the other two non-opened phases may be on-controlled near the lock end of the steering wheel and feedback force associated with the SFA system may be generated.

FIG. 2 illustrates that the motor 220 and/or the inverter 210 are controlled in the case where the U-phase is opened, but the present disclosure is not limited thereto, and even when the V-phase or the W-phase is opened, braking torque and/or feedback force associated with the SFA system may be generated through the control of the motor 220 and/or the inverter 210. Further, FIG. 2 illustrates that the U-phase is opened, but the present disclosure is not limited thereto, and even when the FET of the U+ phase or the U-phase is opened, braking torque and/or feedback force may be generated by the same process as that described above.

Figure 3:
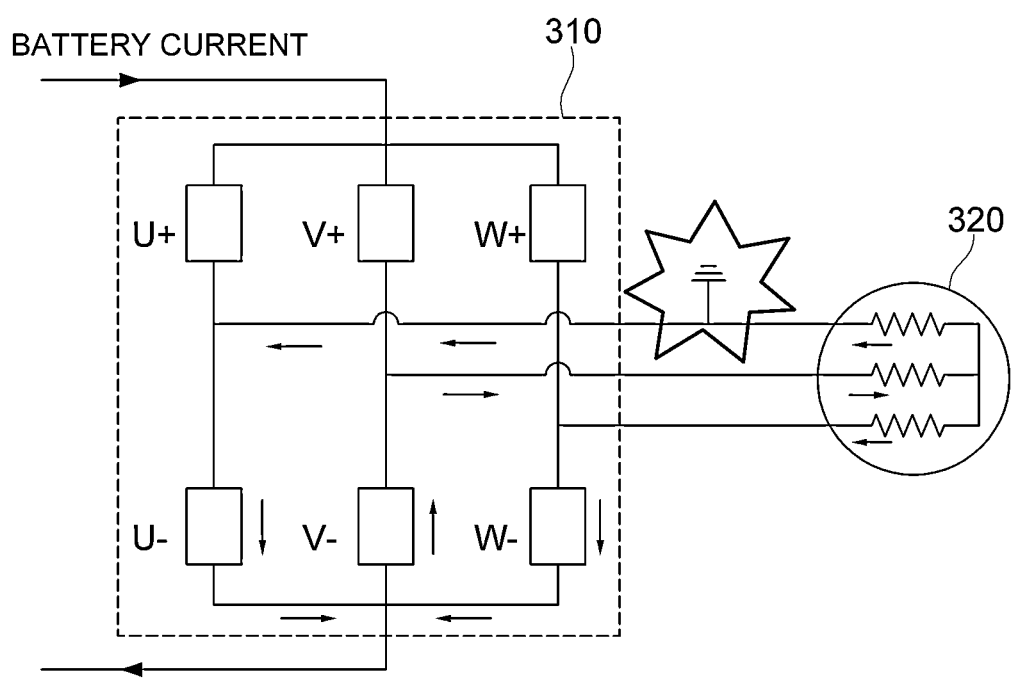
FIG. 3 is a diagram illustrating an example in which feedback force is generated when a short circuit occurs according to the exemplary embodiment of the present disclosure.

FIG. 3 is a diagram illustrating an example in which feedback force is generated when a short occurs according to the exemplary embodiment of the present disclosure. According to the exemplary embodiment, even when the short occurs, an inverter 310 and a motor 320 may be controlled so as to generate feedback force. As illustrated, the inverter 310 may be a three-phase inverter including a U-phase, a V-phase, and a W-phase, and the motor 320 may be configured to be associated with the three-phase inverter.

As described above, a battery current may be provided to the motor 320 through the U-phase, the V-phase, and the W-phase having a phase difference of 120°. However, when any one of the U-phase, the V-phase, and the W-phase is short, the motor 320 may have a fault. In the illustrated example, when the U-phase is short, a large current may continuously flow through the U-phase, and accordingly, the motor 320 and/or the inverter 310 may not perform normal three-phase driving.

According to the exemplary embodiment, even when any one phase is short, the control of the motor 320 and/or the inverter 310 may be performed for stably generating braking torque and/or feedback force. When any one phase is short, feedback force may be generated by performing a duty control on the U-phase, the V-phase, and the W-phase, or feedback force associated with the SFA system may be generated by on-controlling the FETs associated with the U-phase, the V-phase, and the W-phase. That is, even when one phase is short, the U-phase, the V-phase, and the W-phase are duty-controlled or all of the FETs associated with the three phases are on-controlled, so that a current may flow in the motor 320, and according to the flow of the current, braking torque and/or feedback force associated with the SFA system may be generated.

According to the exemplary embodiment, the size of braking torque and/or feedback force required near the lock end of the steering wheel may be different from the size of braking torque and/or feedback force required near the region except for the lock end. That is, the size of the required braking torque and/or feedback force may increase as the steering wheel is close to the region near the lock end rotating from the center to the end. For example, in the region near the lock end, the implementation of a load of about 35 Nm through braking torque may be required. For the implementation of different loads, the duty control may be performed near the region except for the lock end of the steering wheel associated with the SFA system and feedback force may be generated, and the FETs associated with the U-phase, the V-phase, and the W-phase may be on-controlled near the lock end of the steering wheel and feedback force associated with the SFA system may be generated.

FIG. 3 illustrates that the motor 320 and/or the inverter 310 are controlled in the case where the U-phase is short, but the present disclosure is not limited thereto, and even when the V-phase or the W-phase is short, braking torque and/or feedback force associated with the SFA system may be generated through the control of the motor 320 and/or the inverter 310. Further, FIG. 3 illustrates that the U-phase is short, but the disclosure invention is not limited thereto, and even when the FET of the U+ phase or the U-phase is short, braking torque and/or feedback force may be generated by the same process as that described above. By the foregoing configuration, the motor 320 and/or the inverter 310 are adaptively controlled based on the size of the required load depending on the degree of the rotation of the steering wheel, thereby continuously providing the driver with stable steering feel.

Figure 4:
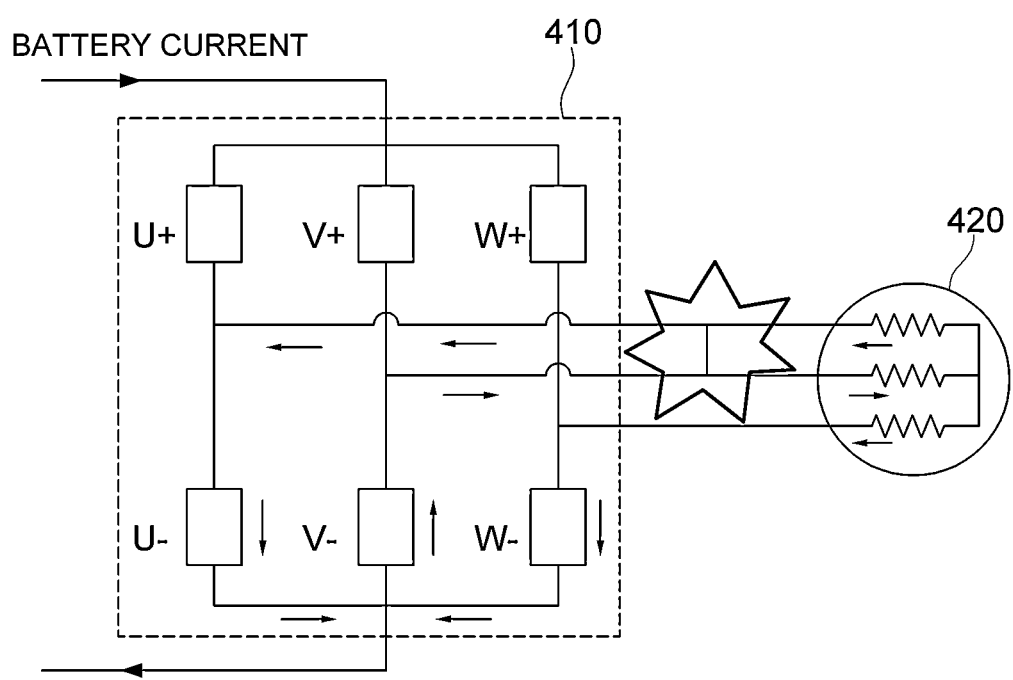
FIG. 4 is a diagram illustrating an example in which feedback force is generated when an interphase short circuit occurs according to the exemplary embodiment of the present disclosure.

FIG. 4 is a diagram illustrating an example in which feedback force is generated when an interphase short occurs according to the exemplary embodiment of the present disclosure. According to the exemplary embodiment, even when the interphase short occurs, an inverter 410 and a motor 420 may be controlled so as to generate feedback force. As illustrated, the inverter 410 may be a three-phase inverter including a U-phase, a V-phase, and a W-phase, and the motor 420 may be configured to be associated with the three-phase inverter.

As described above, a battery current may be provided to the motor 420 through the U-phase, the V-phase, and the W-phase having a phase difference of 120°. However, when any one of the U-phase, the V-phase, and the W-phase is interphase short, the motor 420 may have a fault. In the illustrated example, when the U-phase and the V-phase are short, a large current may continuously flow through the U-phase and the V-phase, and accordingly, the motor 420 and/or the inverter 410 may not perform normal three-phase driving.

According to the exemplary embodiment, even when the interphase short occurs, the control of the motor 420 and/or the inverter 410 may be performed for stably generating braking torque and/or feedback force. The control method of the motor 420 and/or the inverter 410 in the case of the interphase short may be similarly performed to that of the case where one phase is short described with reference to FIG. 3. For example, in the case of the interphase short, a duty control may be performed on the U-phase, the V-phase, and the W-phase and feedback force may be generated, or the FET associated with the U-phase, the V-phase, and the W-phase may be on-controlled and feedback force associated with the SFA system may be generated. In addition, the duty control may be performed near the region except for the lock end of the steering wheel associated with the SFA system and feedback force may be generated, and the FETs associated with the U-phase, the V-phase, and the W-phase may be on-controlled near the lock end of the steering wheel and feedback force associated with the SFA system may be generated.

FIG. 4 illustrates that the motor 420 and/or the inverter 410 are controlled in the case where the U-V phases are interphase short, but the present disclosure is not limited thereto, and even when the U-W-phases or the V-W phases are interphase short, braking torque and/or feedback force associated with the SFA system may be generated through the control of the motor 420 and/or the inverter 410. Further, FIG. 4 illustrates that the U-V phases are interphase short, but the present disclosure is not limited thereto, and even when the short occurs between the FETs, braking torque and/or feedback force may be generated in the same process as that of the foregoing process.

Figure 5:
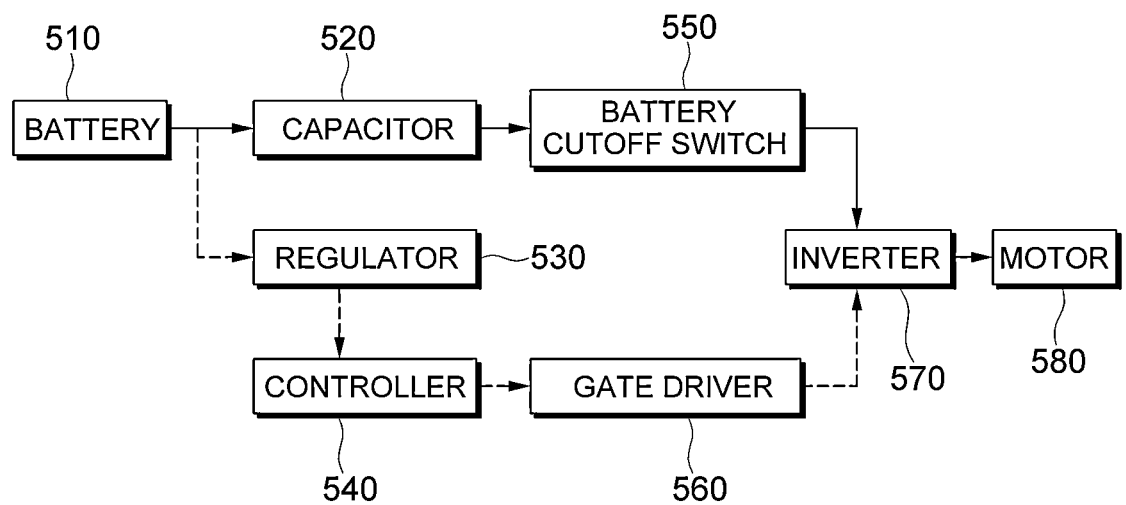
FIG. 5 is a structural diagram illustrating an example in which a battery cutoff switch is connected according to the exemplary embodiment of the present disclosure.

FIG. 5 is an illustrative structural diagram in which a battery cutoff switch 550 is connected according to the exemplary embodiment of the present disclosure. In general, a motor 580 for generating feedback force may receive a high current through a battery 510, a capacitor 520, and an inverter 570, and the inverter 570 may receive a low current through the battery 510, a regulator 530, a controller 540, and a gate driver 560. In this case, a power supply line connected to the battery 510, the capacitor 520, the inverter 570, and the motor 580 may refer to as a power line for operating the motor 580, and a power supply line connected to the battery 510, the regulator 530, the controller 540, the gate driver 560, and the inverter 570 may refer to as a signal line for performing the on/off control of the inverter 570.

According to the exemplary embodiment, when a fault occurs in the motor 580 between the capacitor 520 and the inverter 570, a battery cutoff switch 550 may be connected for blocking a high current. As described above, in the case where one phase is short, the interphase short occurs, and the like, when a battery current continuously flows to the inverter 570 and the like, the excessively large current is generated, so that an overload may be generated in the inverter 570, the motor 580, and the like. In order to prevent the problem, the battery cutoff switch 550 may be connected with the inverter 570, and the high current introduced from the battery 510 may be blocked when the motor 580 has the fault.

According to the exemplary embodiment, even when the power line is blocked by the battery cutoff switch 550, power may be supplied to the motor 580 and the motor 580 may be controlled through the signal line. That is, even when the fault occurs, braking torque and/or feedback force may be stably generated by using the low current provided through the signal line. By the foregoing configuration, by adding the battery cutoff switch 550, even when the motor control described with reference to FIGS. 2 to 4 is performed in case of the occurrence of the fault, braking torque and/or feedback force may be stably generated without a problem, such as an overload.

Figure 6:
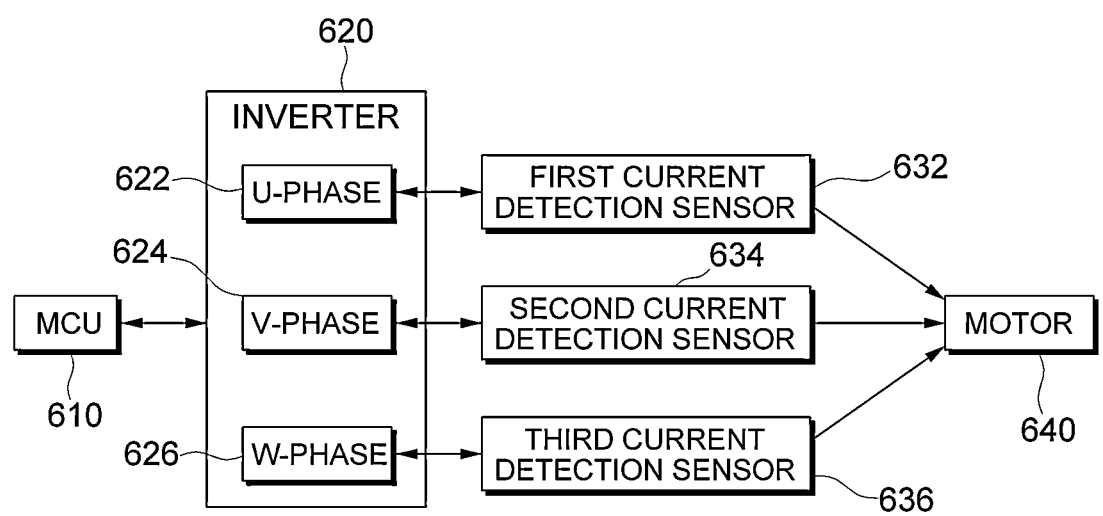
FIG. 6 is a diagram illustrating an example of a plurality of current detection sensors according to the exemplary embodiment of the present disclosure.

FIG. 6 is a diagram illustrating an example of a plurality of current detection sensors 632, 634, and 636 according to the exemplary embodiment of the present disclosure. As illustrated, a U-phase 622 included in an inverter 620 may be connected with a first current detection sensor 632, a V-phase 624 may be connected with a second current detection sensor 634, and a W-phase 626 may be connected with a third current detection sensor 636. Herein, when an abnormal current, not a normal current configuring a sine curve, is generated, the plurality of current detection sensors 632, 634, and 636 may detect the abnormal current.

According to the exemplary embodiment, the plurality of current detection sensors 632, 634, and 636 may detect a current of each phase, provide the detected information to a Micro Controller Unit (MCU) 610 and the like, and determine whether a fault occurs in each phase. That is, the MCU 610 may determine whether the fault occurs based on the information provided from the plurality of current detection sensors 632, 634, and 636. Further, in the case where the fault occurs, the MCU 610 may determine the type of fault (for example, one phase open, one phase short, interphase short, and the like) and generate feedback force associated with the SFA system by controlling the motor 640 based on the determined type of fault.

FIG. 6 illustrates that the three current detection sensors 632, 634, and 636 detect the current in each phase, but the present disclosure is not limited thereto, and the predetermined number of current detection sensors may also exist. By the foregoing configuration, the fault associated with the motor 640 may be simply detected by using the MCU 610 and the plurality of current detection sensors 632, 634, and 636.

Figure 7:
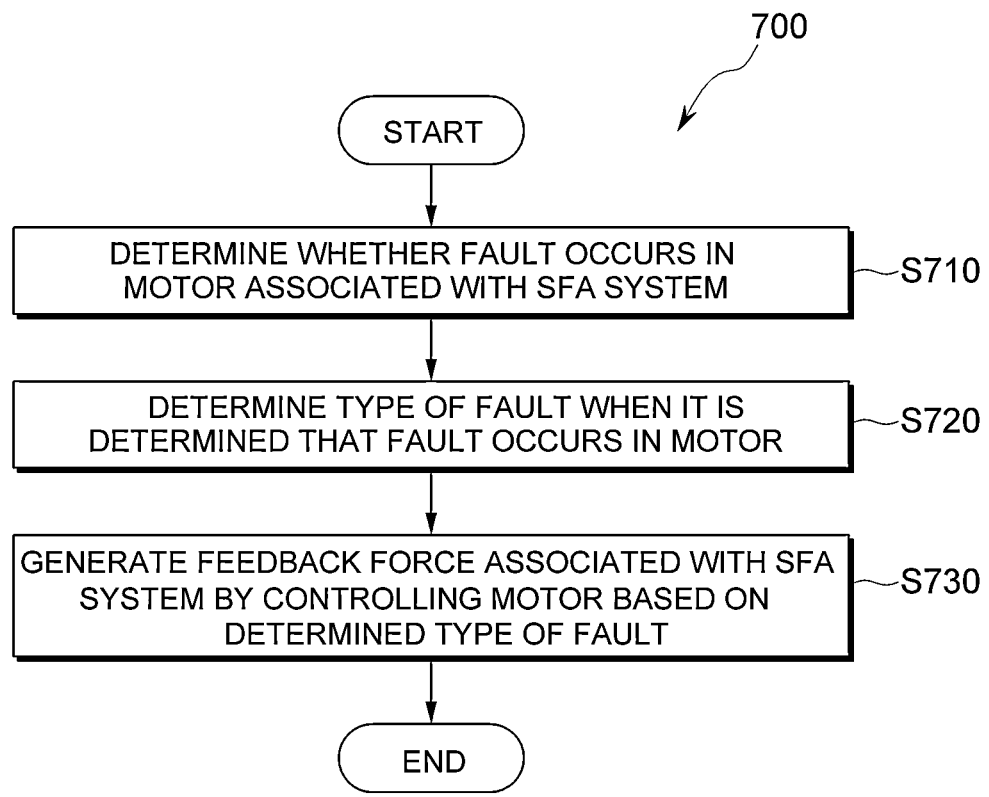
FIG. 7 is a flowchart illustrating an example of a method of generating feedback force in case of a motor fault in the SFA system according to the exemplary embodiment of the present disclosure.

FIG. 7 is a flowchart illustrating an example of a method 700 of generating feedback force in case of a motor fault in the SFA system according to the exemplary embodiment of the present disclosure. The method 700 of generating feedback force in case of a motor fault in the SFA system may be performed by at least one processor (for example, at least one process of a computing device). The method 700 of generating feedback force in case of a motor fault in the SFA system may be initiated by determining, by the processor, whether a fault occurs in the motor associated with the SFA system (S710). Herein, the motor may be associated with a three-phase inverter including a U-phase, a V-phase, and a W-phase.

When it is determined that the fault occurs in the motor, the processor may determine the type of fault (S720). For example, the type of fault may include a first fault type in which any one phase among the U-phase, the V-phase, and the W-phase is open, a second fault type in which any one of phase among the U-phase, the V-phase, and the W-phase is short, and a third fault type in which any two phases among the U-phase, the V-phase, and the W-phase are interphase short.

According to the exemplary embodiment, the processor may generate feedback force associated with the SFA system by controlling the motor based on the determined type of fault (S730). For example, when the type of fault is determined as the first fault type, the processor may generate feedback force associated with the SFA system by on-controlling the FETS associated with other two non-opened phases. In another example, when the type of fault is determined as the second fault type, the processor may generate feedback force by performing a duty control on the U-phase, the V-phase, and the W-phase, or generate feedback force associated with the SFA system by on-controlling the FETs associated with the U-phase, the V-phase, and the W-phase. In another example, when the type of fault is determined as the third fault type, the processor may generate feedback force by performing a duty control on the U-phase, the V-phase, and the W-phase, or generate feedback force associated with the SFA system by on-controlling the FETs associated with the U-phase, the V-phase, and the W-phase.

Figure 8:
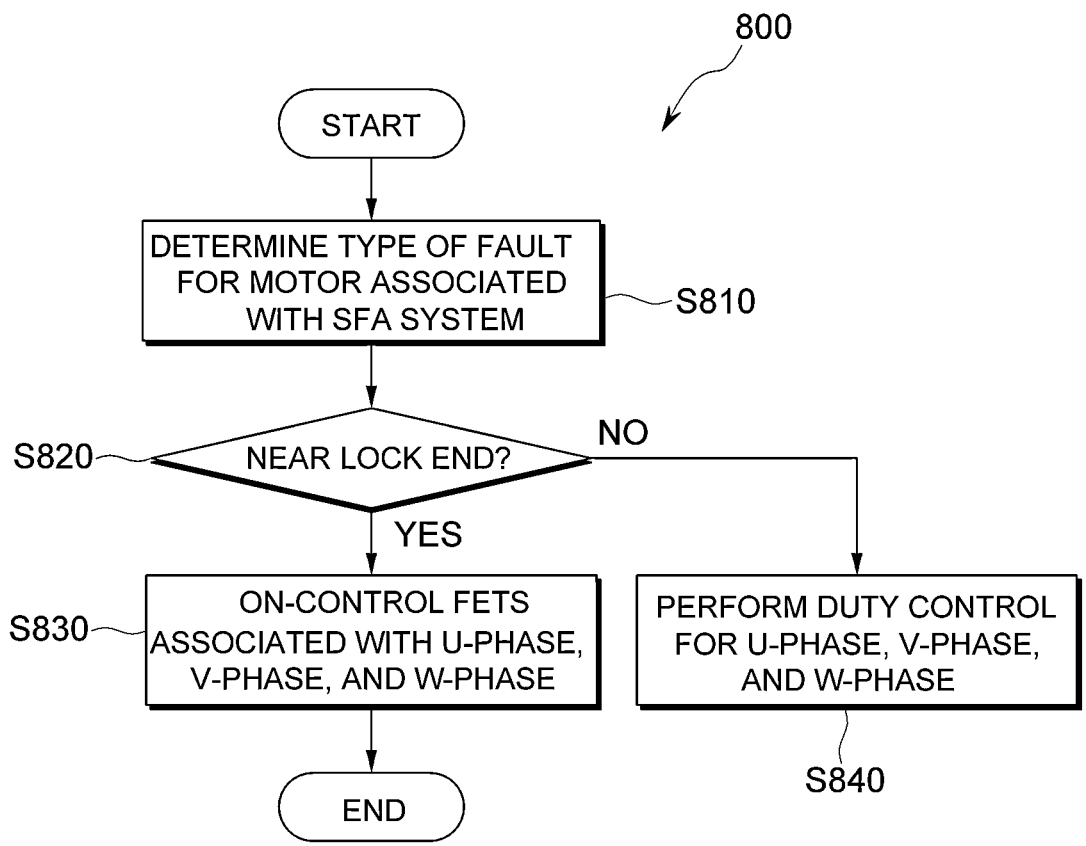
FIG. 8 is a flowchart illustrating an example of a method of generating feedback force based on a rotation of a steering wheel according to the exemplary embodiment of the present disclosure.

FIG. 8 is a flowchart illustrating an example of a method 800 of generating feedback force based on a rotation of a steering wheel according to the exemplary embodiment of the present disclosure. The method 800 of generating feedback force based on a rotation of a steering wheel may be performed by at least one processor (for example, at least one processor of a computing device). As described above, the method 800 of generating feedback force based on a rotation of a steering wheel may be initiated by determining, by the processor, the type of fault when it is determined that the fault occurs in the motor (S810).

As a result of the determination of the type of fault, when the type of fault is determined as the second fault type or the third fault type, the processor may generate feedback force by performing a duty control on the U-phase, the V-phase, and the W-phase, or generate feedback force associated with the SFA system by on-controlling the FETs associated with the U-phase, the V-phase, and the W-phase. In this case, the processor may determine whether the steering wheel is near the lock end based on the degree of rotation of the steering wheel (S820). Herein, whether the steering wheel is near the lock end may be determined based on the degree of rotation of the steering wheel and/or the size of required load. For example, when the steering wheel rotates by a predetermined reference or more, it may be determined that the steering wheel is near the lock end, or when the size of required load by the rotation of the steering wheel is equal to or larger than a predetermined reference, it may be determined that the steering wheel is near the lock end.

When it is determined that the steering wheel is near the lock end, the processor may generate feedback force associated with the SFA system by on-controlling the FETs associated with the U-phase, the V-phase, and the W-phase (S830). Further, when it is determined that the steering wheel is near a region except for the lock end, the processor may generate feedback force by performing duty-control (S840). That is, the processor may generate required braking torque and/or feedback force by a different method based on the degree of rotation of the steering wheel.

Figure 9:
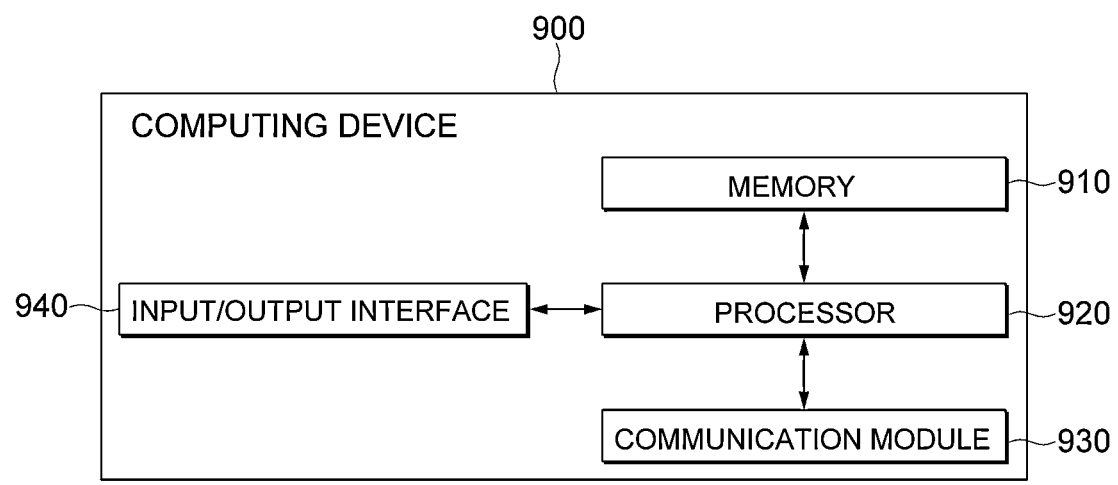
FIG. 9 is a block diagram illustrating an internal configuration of a computing device according to the exemplary embodiment of the present disclosure.

FIG. 9 is a block diagram illustrating an internal configuration of a computing device 900 according to the exemplary embodiment of the present disclosure. The computing device 900 may include a memory 910, a processor 920, a communication module 930, and an input/output interface 940. Herein, the computing device 900 may include an SFA system and/or an SbW system or may be a device associated with an SFA system and/or an SbW system. As illustrated in FIG. 9, the computing device 900 may be configured to communicate information and/or data through a network by using the communication module 930.

The memory 910 may include a predetermined non-transitory computer readable recording medium. According to the exemplary embodiment, the memory 910 may include a permanent mass storage device, such as a Random Access Memory (RAM), a Read Only Memory (ROM), a disc drive, a Solid State Drive (SSD), and a flash memory. For another example, the permanent mass storage device, such as a ROM, an SSD, a flash memory, and a disc drive, may be included in the computing device 900 as a separate permanent storage device distinguished from the memory. Further, an operating system and at least one program code may be stored in the memory 910.

The software constituent elements may be loaded from a computer readable recording medium that is separate from the memory 910. The separate computer readable recording medium may include a recording medium directly connectable to the computing device 900, and may include, for example, a computer readable recording medium, such as a floppy drive, a disc, a tape, a DVD/CD-ROM drive, and a memory card. For another example, the software constituent elements may also be loaded to the memory 910 through the communication module 930, not the computer readable recording medium. For example, at least one program may be loaded to the memory 910 based on a computer program installed by files provided through the communication module 930 by developers or a file distribution system distributing an installation file of an application.

The processor 920 may be configured to process a command of the computer program by performing basic arithmetic, logic, and input/output operations. The command may be provided to a user terminal (not illustrated) or other external systems by the memory 910 or the communication module 930.

The communication module 930 may provide a configuration or a function for communication between the user terminal (not illustrated) and the computing device 900 through the network, and may provide a configuration or a function for communication between the computing device 900 and an external system (for example, a separate cloud system). For example, a control signal, a command, data, and the like provided under the control of the processor 920 of the computing device 900 may be transmitted to the user terminal and/or an external system through a communication module of the user terminal and/or the external system via the communication module 930 and the network.

The input/output interface 940 of the computing device 900 may be a means, which may be connected with the computing device 900 or included in the computing device 900, for interfacing with a device (not illustrated) for an input or output. FIG. 9 illustrates that the input/output interface 940 is the element separately configured from the processor 920, but the present disclosure is not limited thereto, and the input/output interface 940 may be configured to be included in the processor 920. The computing device 900 may include more constituent elements than those of FIG. 9. However, it is not necessary to clearly illustrate most of the constituent elements of the related art.

The processor 920 of the computing device 900 may be configured to manage, process, and/or store information and/or data received from the plurality of user terminals and/or the plurality of external systems.

The foregoing method and/or various exemplary embodiments may be implemented by a digital electronic circuit, computer hardware, firmware, software, and/or a combination thereof. Various exemplary embodiments of the present disclosure may be executed by a data processing device, for example, one or more programmable processors and/or one or more programmable computing devices, or may be implemented as a computer-readable recording medium and/or a computer program stored in a computer-readable recording medium. The computer program may be written in any form of programming language, including a compiled language or an interpreted language, and may be distributed in any form, such as a stand-alone program, module, and subroutine. The computer program may be distributed through one computing device, the plurality of computing devices connected through the same network, and/or the plurality of computing devices distributed to be connected through the plurality of different networks.

The foregoing method and/or various exemplary embodiments may be performed by one or more processors configured to execute one or more computer programs which process, store, and/or manage a predetermined role, function, and the like by operating or generating output data based on input data. For example, the method and/or various exemplary embodiments of the present disclosure may be performed by a special-purpose logic circuit, such as a Field Programmable Gate Array (FPGA) or an Application Specific Integrated Circuit (ASIC), and a device and/or system for performing the method and/or various exemplary embodiments of the present disclosure may be implemented as a special-purpose logic circuit, such as an FPGA or an ASIC.

One or more processors executing a computer program may include a general purpose or special purpose microprocessor and/or one or more processors of any kind of digital computing device. The processor may receive a command and/or data from each of the read-only memory and the random access memory, or receive a command and/or data from the read-only memory and the random access memory. In the present disclosure, the constituent elements of the computing device performing the method and/or the exemplary embodiments may include one or more processors for executing commands and one or more memory devices for storing commands and/or data.

According to the exemplary embodiment, the computing device may transceive data with one or more large-capacity storage devices for storing data. For example, the computing device may receive data from a magnetic disc or an optical disc and/or transmit the data to the magnetic disc or the optical disc. A computer readable storage medium suitable for storing commands and/or data associated with the computer program may include a predetermined type of non-volatile memory including a semiconductor memory device, such as an Erasable Programmable Read-Only Memory (EPROM), an Electrically Erasable PROM (EEPROM), and a flash memory device, but is not limited thereto. For example, the computer readable storage medium may include an internal hard disc or a portable disc, such as a magnetic disc, an optical magnetic disc, and CD-ROM and DVD discs.

In order to provide interaction with a user, the computing device may include a display device (for example, a Cathode Ray Tube (CRT) and a Liquid Crystal Display (LCD)) for providing or displaying information to the user and a pointing device (for example, a keyboard, a mouse, and a trackball) capable of providing an input and/or a command to the computing device, but is not limited thereto. That is, the computing device may further include a predetermined different type of devices for providing interaction with a user. For example, for the interaction with the user, the computing device may provide the user with a predetermined type of sensory feedback including a visual feedback, an audible feedback, and/or a tactile feedback. In this regard, the user may provide an input to the computing device through various gestures, such as sight, voice, and motion.

In the present disclosure, various exemplary embodiments may be implemented in a computing system including a backend constituent element (for example, a data server), a middleware constituent element (for example, an application server), and/or a frontend constituent element. In this case, the constituent elements may be mutually connected by a predetermined type or medium of digital data communication, such as a communication network. For example, the communication network may include a Local Area Network (LAN) and a Wide Area Network (WAN).

The computing device based on the illustrative exemplary embodiments described in the present specification may be implemented by using hardware and/or software which includes a user device, a User Interface (UI) device, a user terminal, or a client device and is configured to interact with a user. For example, the computing device may include a portable computing device, such as a laptop computer. Additionally or alternatively, the computing device may include a Personal Digital Assistant (PDA), a tablet PC, a game console, a wearable device, an Internet of Things (IoT) device, a Virtual Reality (VR) device, an Augmented Reality (AR) device, and the like, but is not limited thereto. The computing device may further include a different type of device configured to interact with a user. Further, the computing device may include a portable communication device (for example, a mobile phone, a smart phone, and a wireless cellular phone) suitable for wireless communication through a network, such as a mobile communication network. The computing device may be configured to wirelessly communicate with a network server by using wireless communication technologies, such as Radio Frequency (RF), Microwave Frequency (MWF), and/or Infrared Ray Frequency (IRF) and/or protocols.

In the present disclosure, various exemplary embodiments including specific structural and function details are illustrative. Therefore, the exemplary embodiments of the present disclosure are not limited to the foregoing, and may be implemented in various different forms. In addition, the term used in the present disclosure is for describing some exemplary embodiments, and is not interpreted to limit the exemplary embodiment. For example, the singular words may be construed to include the plural as well, unless the context clearly indicates otherwise.

All of the terminologies containing one or more technical or scientific terminologies have the same meanings that persons skilled in the art understand ordinarily unless they are not defined otherwise. Further, a term ordinarily used like that defined by a dictionary shall be construed that it has a meaning equal to that in the context of a related description.

In the present specification, the present disclosure has been described in relation to some exemplary embodiments, but the present disclosure may be variously modified and changed within the range without departing from the scope of the present disclosure that those skilled in the art can understand. Further, the modification and the change are intended to fall within the scope of the claims appended in the present specification.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method of generating feedback force when a motor of a Steering Feedback Actuator (SFA) system has a fault, the method being performed by at least one processor, the method comprising:
   determining whether a fault occurs in a motor associated with an SFA system;
   determining the type of fault when it is determined that the fault occurs in the motor; and
   generating feedback force associated with the SFA system by controlling the motor based on the determined type of fault,
   wherein the motor is associated with a three-phase inverter including a U-phase, a V-phase, and a W-phase,
   wherein the inverter is associated with a battery cutoff switch which blocks a high current between a battery associated with the motor and the inverter, and
   the battery cutoff switch is controlled based on whether the fault occurs in the motor,
   wherein the type of fault includes a first fault type in which any one phase among the U-phase, the V-phase, and the W-phase is open, a second fault type in which any one of phase among the U-phase, the V-phase, and the W-phase is short, and a third fault type in which any two phases among the U-phase, the V-phase, and the W-phase are interphase short.

2. The method of claim 1, wherein the generating of the feedback force associated with the SFA system by controlling the motor based on the determined type of fault includes, when it is determined that the type of fault is the first fault type, generating feedback force by performing duty control on a Field Effect Transistor (FET) associated with the other two non-opened phases or generating feedback force associated with the SFA system by on-controlling the FET.

3. The method of claim 1, wherein the generating of the feedback force associated with the SFA system by controlling the motor based on the determined type of fault includes, when it is determined that the type of fault is the second fault type, generating feedback force by performing duty control on the U-phase, the V-phase, and the W-phase or generating feedback force associated with the SFA system by on-controlling FETs associated with the U-phase, the V-phase, and the W-phase.

4. The method of claim 3, wherein the generating of the feedback force associated with the SFA system when it is determined that the type of fault is the second fault type includes generating feedback force by performing the duty control near a region except for a lock end of a steering wheel associated with the SFA system, and generating feedback force associated with the SFA system by on-controlling FETs associated with the U-phase, the V-phase, and the W-phase near the lock end of the steering wheel.

5. The method of claim 1, wherein the generating of the feedback force associated with the SFA system by controlling the motor based on the determined types of faults includes, when it is determined that the type of fault is the third fault type, generating feedback force by performing duty control on the U-phase, the V-phase, and the W-phase or generating feedback force associated with the SFA system by on-controlling FETs associated with the U-phase, the V-phase, and the W-phase.

6. The method of claim 5, wherein the generating of the feedback force associated with the SFA system when it is determined that the type of fault is the third fault type includes generating feedback force by performing the duty control near a region except for a lock end of a steering wheel associated with the SFA system, and generating feedback force associated with the SFA system by on-controlling FETs associated with the U-phase, the V-phase, and the W-phase near the lock end of the steering wheel.

7. The method of claim 1, wherein the inverter is associated with a plurality of current detection sensors including a first current detection sensor, a second current detection sensor, and a third current detection sensor, and
the determining of whether the fault occurs in the motor associated with the SFA system includes determining whether the fault occurs in the motor associated with the SFA system based on the first current detection sensor associated with the U-phase, the second current detection sensor associated with the V-phase, and the third current detection sensor associated with the W-phase.

8. A computing device, comprising:
a communication module;
a memory; and
at least one processor connected with the memory and configured to execute at least one computer readable program included in the memory,
wherein the said at least one program includes commands for
determining whether a fault occurs in a motor associated with an SFA system,
determining the type of fault when it is determined that the fault occurs in the motor; and
generating feedback force associated with the SFA system by controlling the motor based on the determined type of fault,
wherein the motor is associated with a three-phase inverter including a U-phase, a V-phase, and a W-phase,
wherein the inverter is associated with a battery cutoff switch which blocks a high current between a battery associated with the motor and the inverter, and
the battery cutoff switch is controlled based on whether the fault occurs in the motor,
wherein the type of fault includes a first fault type in which any one phase among the U-phase, the V-phase, and the W-phase is open, a second fault type in which any one of phase among the U-phase, the V-phase, and the W-phase is short, and a third fault type in which any two phases among the U-phase, the V-phase, and the W-phase are interphase short.

9. The computing device of claim 8, wherein the said at least one program further includes commands for generating feedback force by performing duty control on a Field Effect Transistor (FET) associated with the other two non-opened phases or generating feedback force associated with the SFA system by on-controlling the FET when it is determined that the type of fault is the first fault type.

10. The computing device of claim 8, wherein the said at least one program further includes commands for generating feedback force by performing duty control on the U-phase, the V-phase, and the W-phase or generating feedback force associated with the SFA system by on-controlling FETs associated with the U-phase, the V-phase, and the W-phase when it is determined that the type of fault is the second fault type.

11. The computing device of claim 10, wherein the said at least one program further includes commands for generating feedback force by performing the duty control near a region except for a lock end of a steering wheel associated with the SFA system, and generating feedback force associated with the SFA system by on-controlling FETs associated with the U-phase, the V-phase, and the W-phase near the lock end of the steering wheel.

12. The computing device of claim 8, wherein the said at least one program further includes commands for generating feedback force by performing duty control on the U-phase, the V-phase, and the W-phase or generating feedback force associated with the SFA system by on-controlling FETs associated with the U-phase, the V-phase, and the W-phase when it is determined that the type of fault is the third fault type.

13. The computing device of claim 12, wherein the said at least one program further includes commands for generating feedback force by performing the duty control near a region except for a lock end of a steering wheel associated with the SFA system, and generating feedback force associated with the SFA system by on-controlling FETs associated with the U-phase, the V-phase, and the W-phase near the lock end of the steering wheel.

14. The computing device of claim 8, wherein the inverter is associated with a plurality of current detection sensors including a first current detection sensor, a second current detection sensor, and a third current detection sensor, and
the said at least one program further includes commands for determining whether the fault occurs in the motor associated with the SFA system based on the first current detection sensor associated with the U-phase, the second current detection sensor associated with the V-phase, and the third current detection sensor associated with the W-phase.

* * * * *